(12) United States Patent
Thomas

(10) Patent No.: US 7,395,629 B1
(45) Date of Patent: Jul. 8, 2008

(54) DEVICES INCORPORATING FLEXIBLE, EXTENDED-IN-LENGTH LIGHT SOURCES INCLUDING CATCH NET, BATONS AND SAFETY DEVICES

(76) Inventor: Jeffery A. Thomas, 1811 Mountainbrook Dr. SE., Huntsville, AL (US) 35801

( * ) Notice: Subject to any disclaimer, the term of this patent is extended or adjusted under 35 U.S.C. 154(b) by 0 days.

(21) Appl. No.: 11/491,865

(22) Filed: Jul. 24, 2006

Related U.S. Application Data

(60) Provisional application No. 60/701,866, filed on Jul. 22, 2005.

(51) Int. Cl.
    *A01K 75/02* (2006.01)
    *A01K 77/00* (2006.01)
    *A01K 97/00* (2006.01)

(52) U.S. Cl. .................................. 43/17.5; 43/7; 43/11

(58) Field of Classification Search ................. 43/17.5, 43/17.6, 7, 11; 362/119, 120
See application file for complete search history.

(56) References Cited

U.S. PATENT DOCUMENTS

| | | | | |
|---|---|---|---|---|
| 3,849,926 A | * | 11/1974 | Fox | 43/11 |
| 4,117,618 A | * | 10/1978 | Utsler | 43/17.5 |
| 4,513,692 A | * | 4/1985 | Kuhnsman et al. | 119/795 |
| 4,697,374 A | | 10/1987 | Simms | |
| 4,775,920 A | * | 10/1988 | Seibert et al. | 362/109 |
| 4,800,667 A | * | 1/1989 | Johnson | 43/17.5 |
| 5,063,700 A | * | 11/1991 | Kiefer et al. | 43/17.6 |
| 5,276,990 A | * | 1/1994 | Ramirez | 43/17.5 |
| 5,357,410 A | * | 10/1994 | Cota et al. | 362/109 |
| 5,442,875 A | * | 8/1995 | Brundage et al. | 43/11 |
| 5,586,403 A | * | 12/1996 | Ward | 43/17.5 |
| 5,644,864 A | * | 7/1997 | Kelly | 43/17.5 |
| 5,738,433 A | * | 4/1998 | Sparks | 362/109 |
| 5,826,366 A | * | 10/1998 | Matibe | 43/17.5 |
| 5,967,638 A | * | 10/1999 | Gorman et al. | 362/84 |
| 6,061,946 A | * | 5/2000 | Toelken | 43/17.5 |
| 6,115,955 A | * | 9/2000 | Sledge | 43/18.1 HR |
| 6,149,286 A | * | 11/2000 | Wiggins | 362/259 |
| 6,405,475 B1 | * | 6/2002 | Wallace et al. | 43/17.5 |
| 6,523,987 B1 | * | 2/2003 | Lee | 362/577 |
| 6,594,417 B1 | * | 7/2003 | Hulse | 385/31 |
| 6,594,942 B1 | * | 7/2003 | Sherwood et al. | 43/17.5 |
| 6,726,350 B1 | * | 4/2004 | Herold | 362/555 |
| 6,742,909 B2 | * | 6/2004 | Conti et al. | 362/84 |
| 6,745,786 B1 | * | 6/2004 | Davis | 135/65 |
| 6,758,588 B2 | * | 7/2004 | Hsu | 362/497 |
| 6,908,216 B2 | | 6/2005 | Love | |
| 7,073,917 B2 | * | 7/2006 | VanderSchuit | 362/96 |
| 2003/0019145 A1 | * | 1/2003 | Lybarger et al. | 43/17.5 |

* cited by examiner

*Primary Examiner*—David J Parsley
(74) *Attorney, Agent, or Firm*—Steven M. Clodfelter

(57) ABSTRACT

A portable illuminated, transparent or translucent tubular device is provided. The light source is a flexible, extended-in-length light source mounted in the tubular device, with a housing associated with the tubular device. The housing encloses batteries, and in some instances circuitry, for powering the light source. In a preferred embodiment, the tubular device is a handle for a fish or crab net, with the light source extending around the loop of the net.

16 Claims, 8 Drawing Sheets

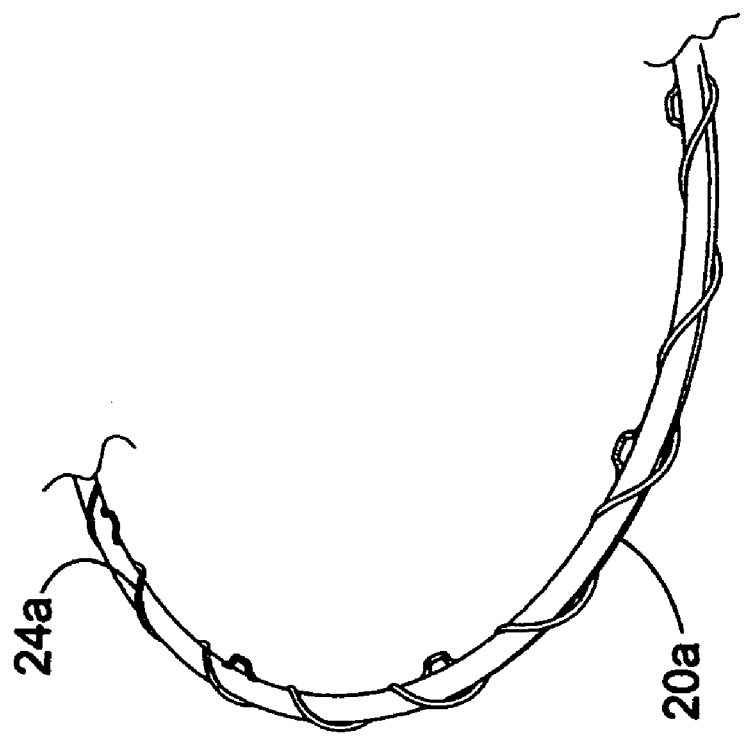
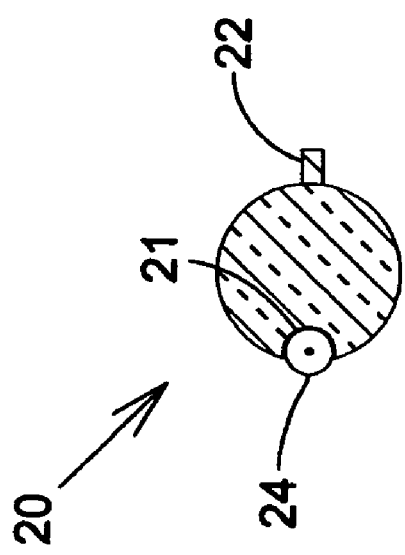

DEVICES INCORPORATING FLEXIBLE, EXTENDED-IN-LENGTH LIGHT SOURCES INCLUDING CATCH NET, BATONS AND SAFETY DEVICES

CROSS REFERENCE TO RELATED APPLICATIONS

This application claims the benefit of provisional application No. 60/701,866, filed Jul. 22, 2005.

FIELD OF THE INVENTION

This application relates generally to articles incorporating light sources, and particularly to illuminated fishing/crab nets, batons or wands and the like.

BACKGROUND OF THE INVENTION

Attempts have been made to provide illuminated fishing nets, such as one disclosed in U.S. Pat. No. 6,908,216. This particular net is provided with a flashlight mounted to a handle portion just above the net. In use, the flashlight is used to spot or locate an animal or fish to be captured with the net. However, this type of net has found little success on the market, perhaps because it was not cost-effective, or perhaps because in order to capture fish or an animal, the light beam must be moved away from the animal or fish in order to manipulate the net into a catch position. Similar light sources are found on fishing implements in order to provide illumination for a fisherman at night. In addition, a number of fishing lures employ miniaturized light sources in order to more effectively attract fish. With respect to crabs, lobsters and the like, U.S. Pat. No. 4,697,374 provides a shellfish attractant device using a green LED and attachable to a crab pot or other fishing apparatus in order to attract shellfish.

With respect to novelty items and toys, children on a beach enjoy chasing and catching beach crabs with flashlights and hand-held nets. In fact, along almost any recreational beach, parents with children may be found chasing crabs with nets and flashlights at night. However, when a crab is illuminated with white light, particularly a bright light such as a flashlight necessary to spot the crabs, an alarm reaction is provoked in the crab, resulting in the crab scurrying or swimming away. Such an alarm reaction in the crab is problematic for children, or those otherwise hunting crabs for a food source or other reasons.

In addition to the foregoing, parents are always concerned about the whereabouts of their children, particularly at night. Where an easily-identifiable marker is provided that the children will play with, and particularly adapted for use at night, parents will be more comfortable allowing their children to play along a beach at night generally unsupervised but within sight of the marker. In addition, related uses for an illuminated device of the instant invention may be a warning device for a bicyclist wherein an illuminated wand may be mounted to the bicycle or worn by a bicyclist so as to be visible from at least sides and from a rear of a bicycle, or a walking stick or cane carried by a pedestrian who walks at night so as to be viewable from the front, sides and rear.

In accordance with the foregoing, it is one object of the invention to provide a combined crab net and light source that minimizes the alarm reaction in crabs. Is another object of the invention to provide, in general, a novelty, marker or warning device comprising a self-powered transparent or translucent member that may be in a tubular or shaft-like form configured into any shape. It is yet another object of the invention to provide a fish-attracting light source. Other objects of the invention will become apparent upon a reading of the following specification.

SUMMARY OF THE INVENTION

This invention is directed to devices utilizing a flexible, linear light emitter adapted to provide illumination light of a selected color, the light-dispensing source being mounted in a transparent or translucent tubular housing wrapped around a support member and connected to a battery.

The illuminated fishing net may take the form of a fishing or crab net having a circular loop or support member conventionally supporting a catch net. A battery and circuitry for powering the light emitter may be carried in a housing in the handle, and from which power is fed to the light emitter. The light emitter it is configured for illuminating either the loop portion, the handle portion or both. For a crab or fish net exposed to water, the battery and circuitry housing in the handle is made waterproof, as by potting the circuitry in waterproof potting material and providing a sealed compartment for the batteries, and may carry a waterproof pressure switch for activating the light emitter. In other applications, a device using similar components along the length of a shaft, such as a novelty twirling baton, provides a significant improvement in entertainment value of baton twirling under dark conditions For a warning device, an illuminated wand or other shape for a bicyclist, or walking stick or cane for nighttime cycling or walking provides a significant improvement in visibility and safety. Particularly, use of a green light emitter in such a device has been shown to be highly effective for attracting and capturing crabs, although many colors of electroluminescent wire are available for use in Applicant's invention.

BRIEF DESCRIPTION OF THE DRAWINGS

FIG. 3 is a sectional view taken along lines 3-3 of FIG. 2 showing construction details of a hoop portion of my new illuminated net.

FIG. 4 is a partial view showing an alternate construction of a et portion of my new illuminated net.

DETAILED DESCRIPTION OF THE DRAWINGS

Figure 1:
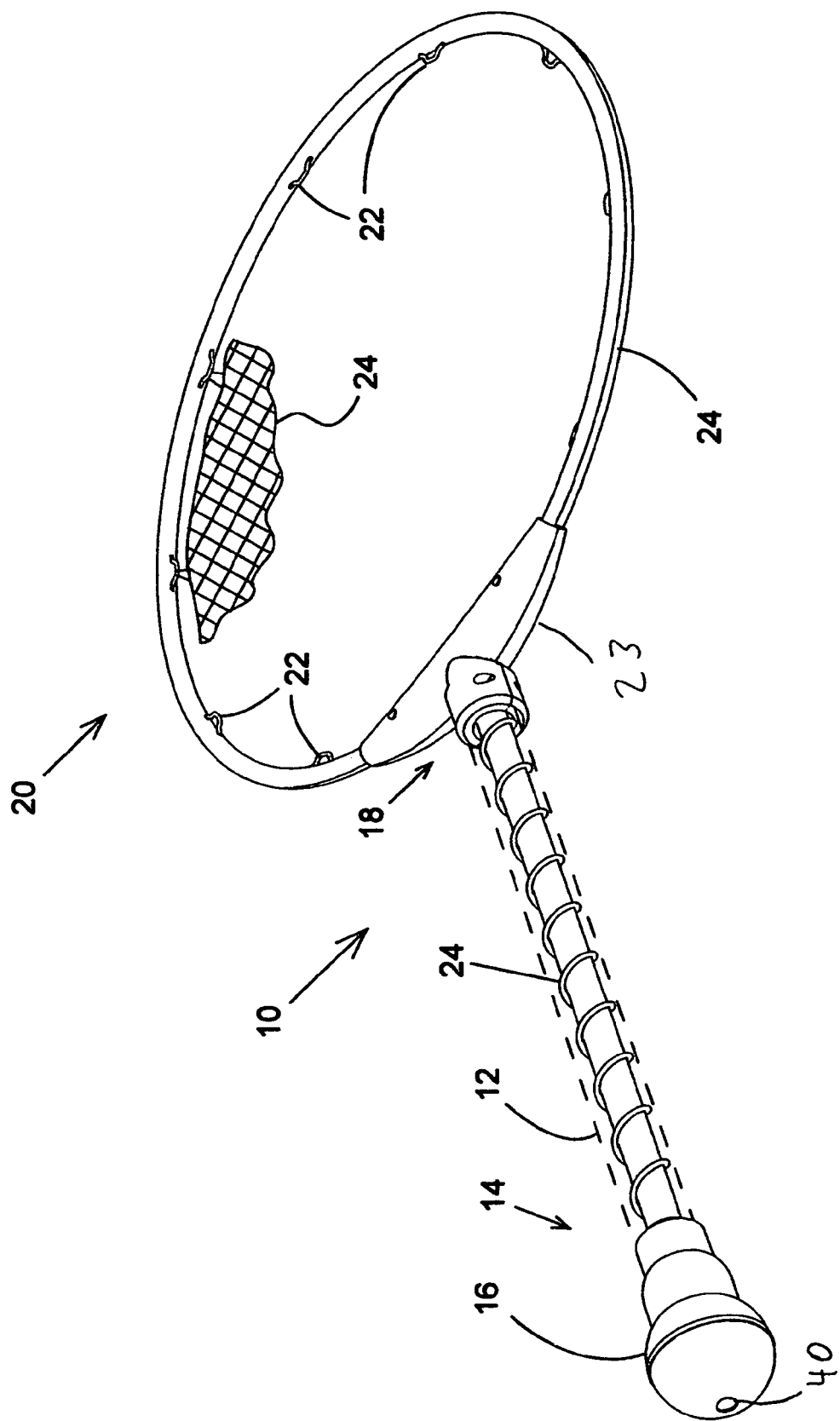
FIG. 1 is an illustration of my new illuminated net, with a net portion being partially shown.

Referring to FIG. 1, there is shown a fishing or crabbing net 10 having a transparent or translucent handle 12 (dashed lines) connected at one end 14 to a generally spherical housing 16 in which a power source and circuitry for energizing the light source is mounted. At an opposite end 18 of handle 12 is connected a transparent or translucent circular loop 20 in turn provided with conventional net supports 22 from which a net 24 (shown broken away for clarity) is conventionally supported by any means known to those skilled in the art. An illuminating flexible, continuous light source 24, which may be in the form of electroluminescent wire, such as that available from Vibelights.com located in Yorba Linda, Calif., is provided in handle 12 in a spiral configuration as shown, and which extends through reinforcing housing 23 and is looped around loop 20, the continuous light source 24 energized by the power source and energizing circuitry in spherical housing 16. While electroluminescent wire is most preferable in the instant invention because it radiates light in 360 degrees, electroluminescent tape, or rope lighting consisting of individual incandescent or LED bulbs may also be used, although it is emphasized that the total diameter of the rope lighting should not exceed a thickness of about eight mm or so, and must be of sufficient flexibility so as to have a bending radius or diameter so as to be wound in a spiral within the diameter of handle 12. Where electroluminescent tape is used, the loop of the net may be configured as a hoop, with the electroluminescent tape mounted along the outer edge, the inner edge or both, of the hoop of the net. In the instance where electroluminescent wire is used in combination with a fishing or crabbing net, the wire should be a heavy-duty grade, such as 5 mm thickness so as to provide durability. In other applications such as a walking stick or cane, or fish attractant or the like, a thinner grade of electroluminescent wire may be used, such as 2.3 mm. While an illuminated handle and loop of a net is shown and described, either the net portion or the handle may be illuminated, or they may each be selectively illuminated simply by providing a power switch that selectively provides power either to the net portion or the handle portion or both.

As noted above, it has been found that a net of the instant invention is particularly useful with respect to catching crabs. Here, it has been found that the alarm reaction that causes crabs to scurry or swim away when approached by a white light is suppressed by the electroluminescent light of the net, causing the crabs to be more easily caught. Presumably, the electroluminescent light resembles phosphorescent light emitted by other sea creatures that do not startle crabs. While an electroluminescent material that emits green light has been demonstrated to be particularly useful in suppressing the alarm reaction in crabs, other electroluminescent colors may also be useful in suppressing an alarm reaction in crabs. In addition, light developed by electroluminescent illumination may also serve to attract fish, particularly at depths such that white light does not readily penetrate, or for use at night.

Figure 2:
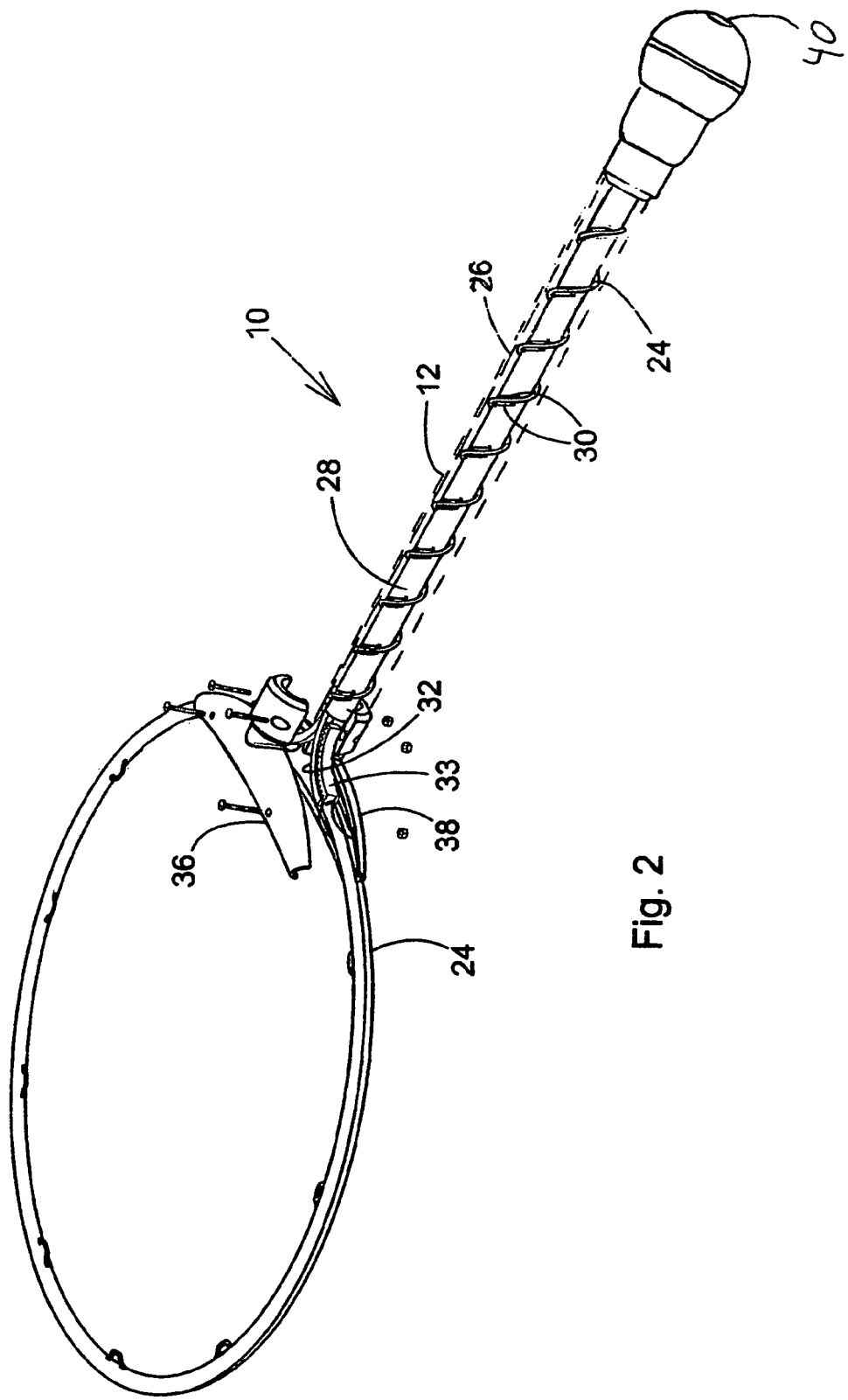
FIG. 2 is a view of the net of FIG. 1 with portions thereof being broken away or exploded so as to show construction details of my new illuminated net.

Referring now to FIG. 2, construction details of a fishing or crabbing net of the instant invention are shown. Here, and as described, a body of the net includes a handle 12 is constructed of a transparent or translucent outer tubular portion 26, which may have an outer diameter of about 0.75 inches and an inner diameter of about 0.625 inches. As noted above, the continuous, flexible light source is sufficiently flexible so as to be bent circularly to fit at least in a spiral configuration within the 0.625 inch diameter of handle 12. While these dimensions are specifically described by way of example for a novelty or toy net, it is emphasized that larger, heavier-duty tubing may be used for use by fishermen, and other diameters of tubing may be used for novelty or toy items. In addition, it should be noted that the handle need not be transparent or contain electroluminescent wire. In this instance, the electroluminescent wire or other continuous light source is supported by and extends only around loop 20 of the net, as will be further described. Here, the electroluminescent wire would be energized at a frequency and voltage so as to provide sufficient light to be used as a light source for enabling netting of a hooked fish caught at night. Such a net would be particularly useful when ice fishing at night as the holes that are cut through the ice and the water therein an are particularly dark, making it difficult to see a hooked fish.

Within handle 12 is mounted a support 28 around which the continuous light source 24 is wrapped. Support 28 may be generally 0.375 inches or so in diameter for a toy or novelty net. Where the net is intended for use by a fisherman, tubular portion 26 may be constructed of a relatively heavy, durable transparent plastic tubing, such as a polycarbonate, Plexiglas-type material or of a transparent or translucent material containing fiber reinforcement, such as fiberglass or graphite fibers in order to withstand heavier loads and use. Conversely, where the net is intended as a novelty item or a toy, lighter transparent or translucent tubing may be used. Support 28 may, but not necessarily, be transparent or translucent, and also constructed in accordance with its use by either a serious fisherman or as a novelty or toy item. Ridges, grooves or guides 30 are provided on support 28 so as to hold the continuous light source 24 in place, and may be oriented so as to facilitate a spiraling configuration of even spacing of continuous light source 24 within handle 12. Such a spiraling, predetermined configuration concentrates a length of electroluminescent wire longer than the handle within the handle, providing greater illumination from the handle than would a single length of electroluminescent wire generally the length of the handle. Alternately, the continuous light source 24 may be configured to extend lengthwise one or more times within handle 10. In this instance, perhaps 2 or 3 or more sets of ridges, grooves or guides 30 on support 28 may be provided to accommodate 2 or 3 or more lengths of electroluminescent wire extending parallel with respect to support 28 and handle 10. In addition, support 28 may be constructed so as to reinforce handle 12, adding strength to handle 12. Further, while use of a support 28 for holding continuous light source 24 in a predetermined configuration, such as the disclosed spiral configuration, is a preferable embodiment for at least a toy or novelty net, support 28 may be omitted entirely, with the continuous light source 24 being loosely disposed within handle 12, or configured as a loose spiral or loops within handle 12, or bonded in either a random or predetermined configuration to an interior surface of handle 12. In yet another embodiment, rather than holding the electroluminescent wire in place with a single support extending the length of handle 12, a plurality of mounts or supports, such as three or four supports evenly spaced within handle 12, may be used to generally hold the electroluminescent wire in place. In yet another alternate embodiment, support 28 may be a hollow tubular member, with at least a single length of electroluminescent wire disposed within the hollow portion of support 28. Support 28 may also be an extrusion, with the electroluminescent wire being fed into the extruded plastic material, thus embedding the electroluminescent wire within support 28. In this instance, there would only be a single length of electroluminescent wire within handle 12. Along these lines, a spiral or straight length of electroluminescent wire may be imbedded in a solid transparent or translucent handle that is either cast or extruded.

In a preferred embodiment of a net, and as shown in FIG. 2, support 28 within handle 12, at the beginning of the loop of the net, may branch from the interior of handle 12 at point 32 to form the loop 20 of the net. In this embodiment, the transparent portions that form the loop of the net may be about 0.375 inches in diameter for a toy or novelty net, and may be of a transparent or translucent polycarbonate, fiberglass-type material or any other suitable material that is durable, and preferably transparent or translucent. With interior support 28 and loop portion 20 of the net being integrally constructed, as by injection molding, the transparent loop portions may have a diameter generally the same as support 28, or may be made of a larger or smaller diameter than a diameter of support 28. For heavier usage, the material of the loop 28 may be thicker, and may contain reinforcing fibers, such as fiberglass or graphite for additional strength.

Still referring to FIG. 2, and near point 32 where support member 28 branches, housing 23 includes opposed housing members 36, 38 and cinch members 33 (only 1 shown). The housings and cinch members, when assembled, are configured to grip the continuous, flexible light illumination source 24 on both sides of the branches from support member 28. The second cinch member (not shown) on the far side of the opposite branch grips the loose end of the illumination source, which is sealed to prevent water from entering the end of the illumination source. With construction of this embodiment, and where the illumination source is an electroluminescent wire, the wire is pulled tight and cinched in groove 21 at its loose end and cinched on the opposite side of loop 20 just prior to entering handle 10 using a second cinch or grip member 33. The housing portions 36, 38 are then assembled, securing the cinch members 33 in place and maintaining tension on the electroluminescent wire within groove 21 of loop 20.

Referring now to FIG. 3, it is seen that loop 20 of the net is provided with a groove 21 extending around an outside region of loop 20, groove 21 being semi circular and of a width and depth corresponding to a width or thickness of continuous illumination source 24. The continuous illumination source 24, such as the aforementioned electroluminescent wire, is snugly fitted within groove 21 to preclude the electroluminescent wire from becoming detached from loop 20. Alternately, as shown in FIG. 4, a loop 20a may have electroluminescent wire 24a simply wrapped around the exterior of loop 20a, or imbedded within the transparent loop forming loop 20, as by casting or extruding the loop portion with the electroluminescent wire therein.

At the opposite end of handle 12 is a spherical housing 16 containing a power source, which may be a pair of replaceable AA or AAA batteries in series to develop 3 volts, and at least an inverter for converting the 3 volt potential to about a 120 volt AC source with a frequency that may range between 2000 and 4000 Hz in accordance with conventional AC voltages and frequencies for energizing electroluminescent wire. Such inverters are well-known in the art, and are sufficiently small so as to easily fit into the confines of enclosure or housing 16, along with a battery compartment. The end portion 42 of housing 16 is removable, as by being threaded, in order to replace the batteries, and constructed so as to be sealed, as by use of an O-ring, against water. A sealed, waterproof push button or pressure switch 40 couples electrical power between the batteries and the inverter.

Figure 5:
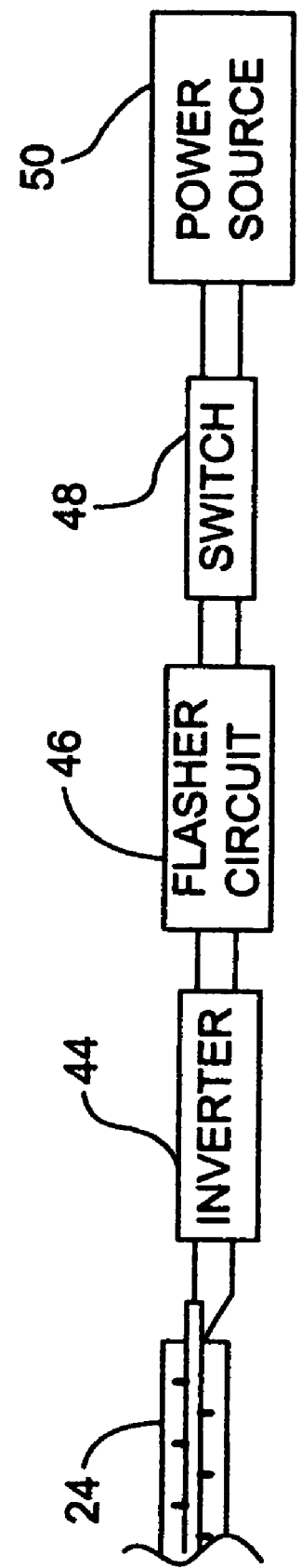
FIG. 5 is a block diagram of circuitry powering an electroluminescent wire light source.

For energizing and powering continuous illumination source 24, and where the continuous illumination source is electroluminescent wire, reference is made to FIG. 5. For any embodiment using electroluminescent wire or tape, such as electroluminescent wire 24, a relatively high AC potential, such as 120 volts or so, and of a frequency of about 2000-4000 Hz, is developed by an inverter 44 and applied between the center conductor and outer conductor of electroluminescent wire 24. In some embodiments used for fishing or other underwater activities, or when used as a safety device a flasher circuit 46 (dashed lines) may be connected between a switch 48 connected to a power source 50, such as a pair of 1.5 volt batteries.

Figure 6:
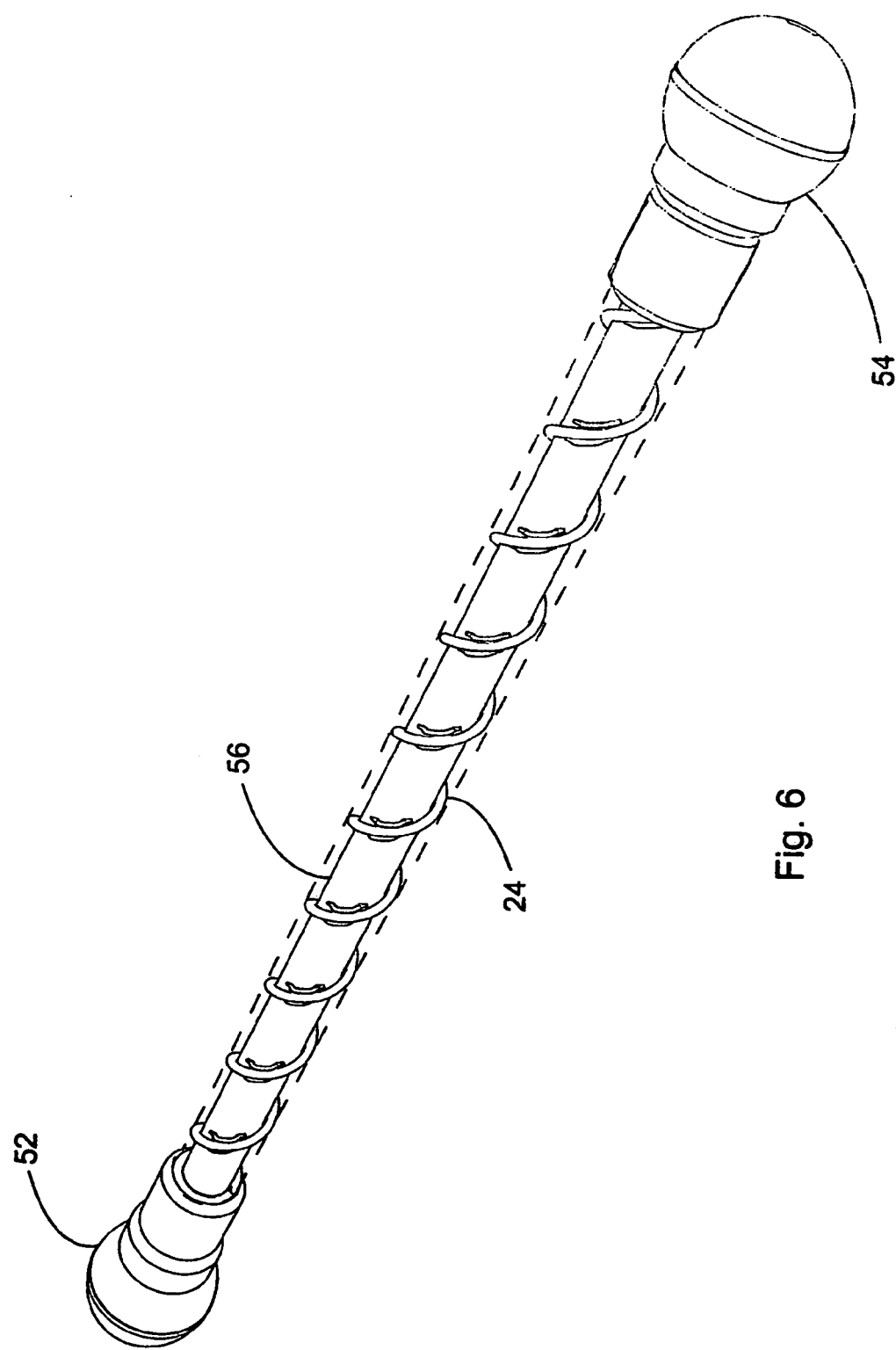
FIG. 6 is a diagrammatic illustration of a baton using my new illumination method.

FIG. 6 illustrates a wand or baton for twirling or other entertainment. In this embodiment, part of the electrical components, such as inverter 44 (FIG. 5), may be located in a spherical enclosure 52 at one end of the body of the baton, while the other components, e.g. power source 50, may be located in a spherical enclosure 54 at the other end of the body of the baton. Wires 56 extending from spherical enclosure 54 to enclosure 52 may be routed through a hollow central region of support 28, or routed along sides of support 28. Such wires are used to connect power from the batteries at one end of the baton to the inverter in the other end of the baton, which in turn is connected to electroluminescent wire 24. Sizing of the components in each of the spherical enclosures, and additional weights as needed, may be used to balance the baton. In addition, the electroluminescent wire is available in many different colors. With such a baton, children may play at beaches, parks and other public and semi-public places at dusk or at night, with parents easily identifying location of their children by the illuminated baton and its color.

Figure 7:
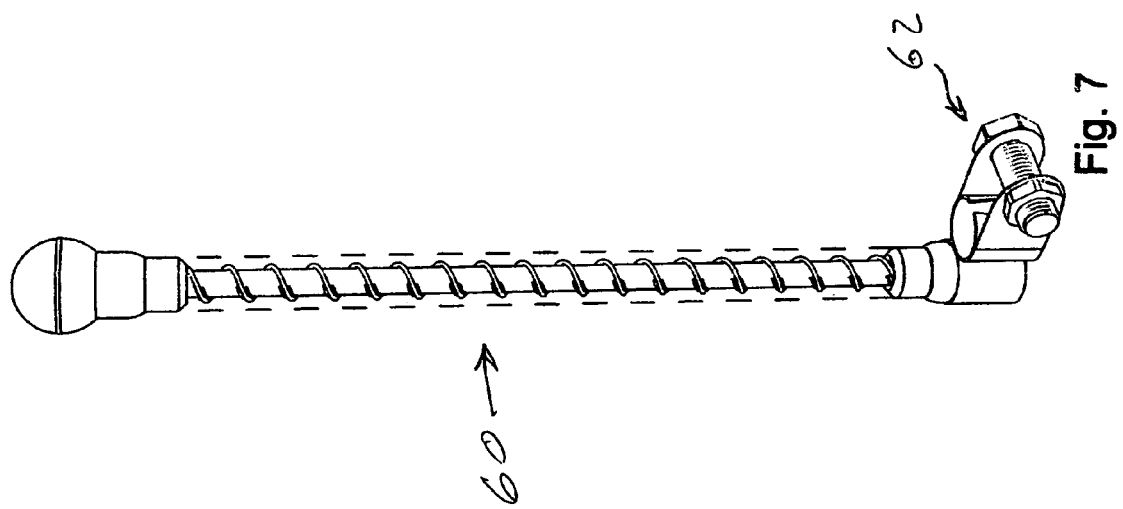
FIG. 7 is a diagrammatic illustration of a bicycle safety wand using a light source of my new method.

FIG. 7 illustrates yet another embodiment of the invention, a safety device for bicyclists for use at night. Here, a wand 60 similar to the baton of FIG. 6, except shorter, is shown with a clamp 62 that may be used to clamp the wand to any convenient location on a bicycle, preferably in a location so as to be readily seen from sides and the rear. Advantageously, the spiral configuration provides a more concentrated light source than a single length of electroluminescent wire as described above, and is highly visible at night. This embodiment may be power continuously, or be made to flash as described above.

Figure 8:
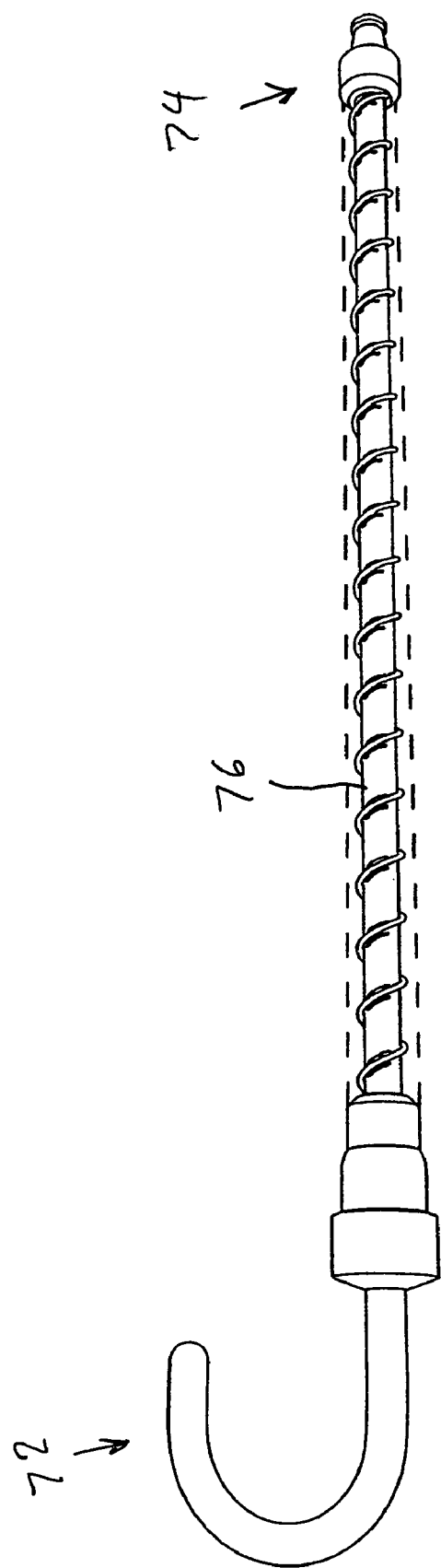
FIG. 8 is a diagrammatic illustration of a walking stick or cane using a light source of my new method.

FIG. 8 illustrates a walking stick or cane 70 for use by pedestrians at night. This embodiment is also similar to the baton of FIG. 6, and has the batteries and inverter mounted in an upper handle 72 of the walking stick or cane. The other end 74 is configured as a conventional end of a walking stick or cane. Again, the spiral configuration of the electroluminescent wire provides a more concentrated light source than would a single length of electroluminescent wire. Again, this embodiment may be made to flash, or be powered continuously. In addition, this embodiment is made of sturdy, durable material, as by making central support 76 of wood, a strong plastic or appropriate metal.

Figure 9:
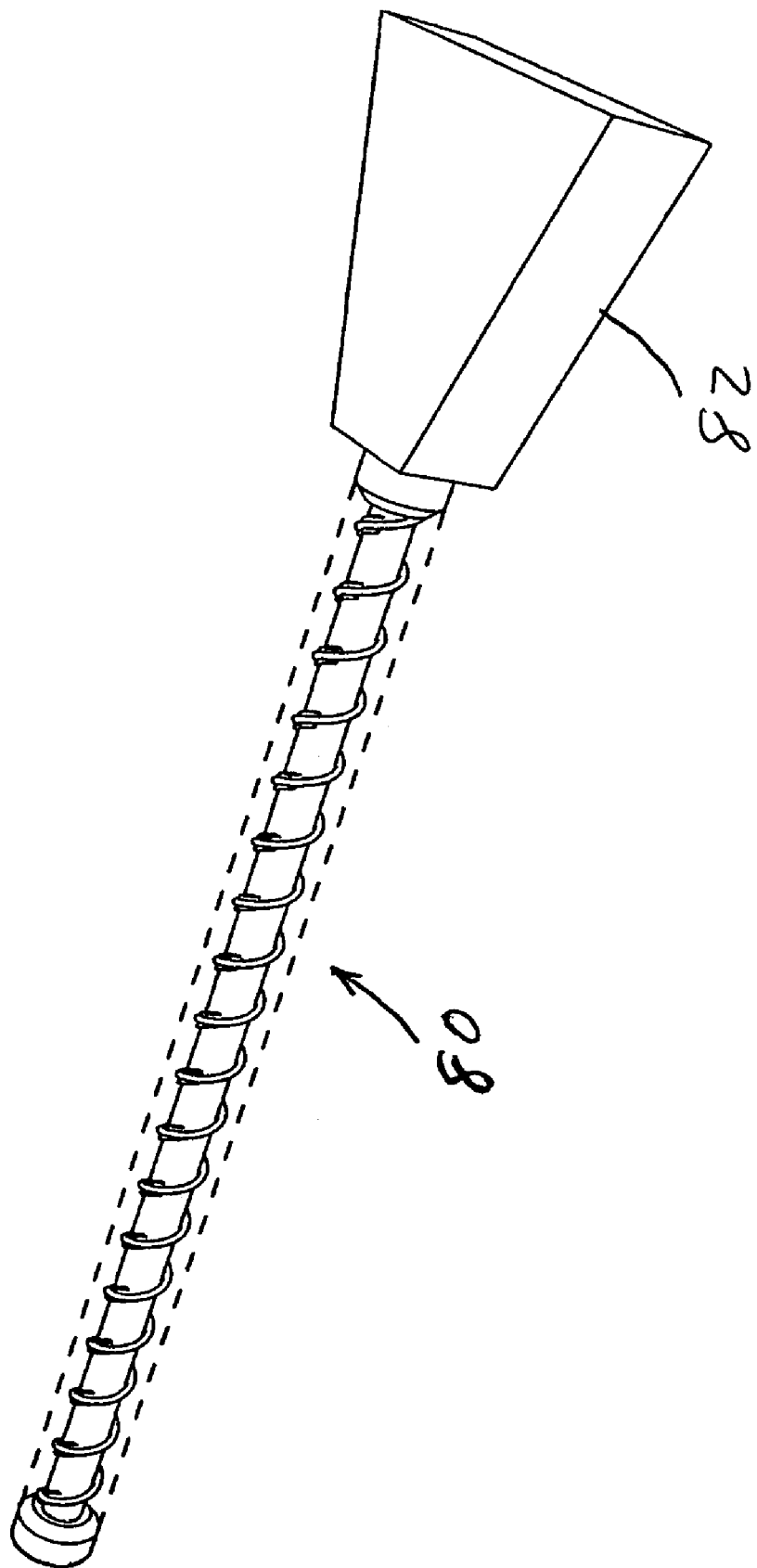
FIG. 9 is a diagrammatic illustration of a floating fish attractant device using a light source of my new method.

FIG. 9 illustrates yet another embodiment of the invention that may be used by fishermen. Here, a wand 80 of the instant invention of 6 inches or so up to about 60 inches or so or longer may be attached to a float 82 so as to be floated in water, and serve as a fish attractant. In this embodiment, green has been shown to be particularly effective at attracting fish. In this embodiment, . . . the batteries, inverter, and when used, a flashing circuitry, would be mounted in a housing in float 82.

Having thus described my invention and the manner of its use, it should be apparent to those skilled in the relevant arts that incidental changes may be made thereto that fairly fall within the scope of the following appended claims, wherein I claim:

1. A catch net comprising:
   a rigid, light transmissive, elongated body having an enlarged loop at one end, and a housing at an opposite end,
   a flexible, extended-in-length, electrically powered electroluminescent material of a character such that light is uniformly and contiguously generated along the length and breadth of said flexible, extended-in-length electrically powered electroluminescent material,
   an electrical power source in said housing, said power source further comprising;
      at least one low voltage, direct current battery,
      an inverter selectively coupled to said at least one battery for transforming low voltage, direct current from said at least one battery to a high voltage oscillating electrical potential, and applying said high voltage oscillating potential to said electroluminescent material in order to uniformly and contiguously generate said light, said flexible, extended-in-length, electrically powered electroluminescent material extending the length of said rigid, light transmissive elongated body and along said enlarged loop, a net supported by said loop, whereby said article may be used as a catch net with said rigid, light transmissive elongated body and said enlarged loop being uniformly and contiguously illuminated by said electroluminescent material.

2. A catch net as set forth in claim 1 wherein said rigid, light transmissive, elongated body is a tubular body, and further comprising one or more supports within said tubular body for holding said flexible, extended-in-length electroluminescent material in a selected configuration within said tubular body.

3. A catch net as set forth in claim 2 wherein said one or more supports are a plurality of ridges within said tubular body for holding said electroluminescent material in said selected configuration.

4. A catch net as set forth in claim 2 wherein said one or more supports in said tubular body further comprises an elongated support generally coaxially disposed within said tubular body, said elongated support extending a length of said tubular body, with said electroluminescent material held in said selected configuration by said elongated support.

5. A catch net as set forth in claim 4 wherein said elongated support is of a light transmissive material.

6. A catch net as set forth in claim 4 further comprising a plurality of ridges on said elongated support, for holding said electroluminescent material in said selected configuration.

7. A catch net as set forth in claim 2 wherein said selected configuration is a spiral configuration.

8. A catch net as set forth in claim 1 further comprising a groove around an outer periphery of said loop, said electroluminescent material held in said groove.

9. A catch net as set forth in claim 1 wherein said electroluminescent material is wrapped around said enlarged loop.

10. A catch net as set forth in claim 4 wherein said elongated support is contiguous with said enlarged loop.

11. A catch net as set forth in claim 10 wherein both said elongated support and said enlarged loop are constructed of a light transmissive material.

12. A catch net as set forth in claim 1 wherein said electroluminescent material is electroluminescent wire.

13. A catch net as set forth in claim 1 wherein said elongated loop is of a light transmissive material.

14. A catch net as set forth in claim 1 wherein said light is of a color selected to suppress a startle reaction in crabs.

15. A catch net as set forth in claim 14 wherein said color of said light is a green color.

16. An elongated body for a portable article, said body incorporating a source of illumination in an extended configuration, said article comprising:

a rigid, light transmissive, elongated tubular body having an enlarged loop at one end, and a housing at an opposite end, said enlarged loop having a groove along an outer edge thereof, a flexible, extended-in-length, electrically powered electroluminescent wire of a character such that light is uniformly and contiguously generated along the length and breadth of said flexible, extended-in-length electrically powered electroluminescent wire, said flexible, extended-in-length, electrically powered electroluminescent wire extending the length of said tubular body and around said enlarged loop, and being held in said groove around said enlarged loop, an elongated support disposed in generally coaxial relation within said tubular body, said elongated support having a plurality of ridges thereon for holding said electroluminescent wire in a spiral configuration around said elongated support within said tubular body, a net supported by said loop, whereby said article may be used as a catch net with said rigid, light transmissive elongated body and said enlarged loop being uniformly and contiguously illuminated by said electroluminescent wire, an electrical power source in said housing, said power source further comprising;

at least one low voltage, direct current battery, an inverter selectively coupled to said at least one battery for transforming low voltage, direct current from said at least one battery to a high voltage oscillating electrical potential, and applying said high voltage oscillating potential to said electroluminescent material in order to uniformly and contiguously generate said light.

* * * * *